(12) United States Patent
Guler et al.

(10) Patent No.: US 7,831,499 B2
(45) Date of Patent: Nov. 9, 2010

(54) METHOD AND SYSTEM FOR CONTROLLING FEEDBACK FOR AN ONLINE AUCTION

(75) Inventors: Kemal Guler, Cupertino, CA (US); Ren Wu, San Jose, CA (US); Francois Rene Paul Boulanger, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2161 days.

(21) Appl. No.: 10/683,985

(22) Filed: Oct. 10, 2003

(65) Prior Publication Data

US 2005/0080709 A1  Apr. 14, 2005

(51) Int. Cl.
*G06Q 40/00* (2006.01)
(52) U.S. Cl. .............................. 705/37; 705/26; 705/27
(58) Field of Classification Search .................. 705/26, 705/27, 37
See application file for complete search history.

(56) References Cited

U.S. PATENT DOCUMENTS

| | | | |
|---|---|---|---|
| 6,285,989 B1 | 9/2001 | Shoham | |
| 6,564,192 B1 | 5/2003 | Kinney, Jr. et al. | |
| 2002/0099643 A1* | 7/2002 | Abeshouse et al. | 705/37 |
| 2002/0120552 A1 | 8/2002 | Grey et al. | |
| 2002/0174052 A1 | 11/2002 | Guler et al. | |
| 2003/0014349 A1* | 1/2003 | Guler et al. | 705/37 |
| 2003/0018515 A1 | 1/2003 | Guler et al. | |
| 2003/0018562 A1 | 1/2003 | Guler et al. | |
| 2003/0041007 A1 | 2/2003 | Grey et al. | |
| 2003/0041009 A1 | 2/2003 | Grey et al. | |
| 2003/0041011 A1 | 2/2003 | Grey et al. | |
| 2003/0041013 A1 | 2/2003 | Grey et al. | |
| 2003/0041014 A1 | 2/2003 | Grey et al. | |
| 2005/0055299 A1* | 3/2005 | Chambers et al. | 705/36 |

* cited by examiner

*Primary Examiner*—Adam Levine

(57) ABSTRACT

A method and system for selecting feedback rules for an online auction. An exemplary method may comprise controlling feedback by customizing feedback rules for an online auction substantially no earlier than entry of auction rules into an auction program by an end-user, storing the customized feedback rules for future use by the auction program, and conducting the online auction by the auction program using the feedback rules.

15 Claims, 3 Drawing Sheets

METHOD AND SYSTEM FOR CONTROLLING FEEDBACK FOR AN ONLINE AUCTION

BACKGROUND

The Internet couples many computers together and provides computer users with a variety of capabilities. For example, using the Internet, computer users may view text and graphics, make purchases, send and receive electronic mail, search for information, and participate in online auctions for goods and services.

An online auction may allow an auctioneer to present an item for bid to an open or closed group of parties. The parties may view information regarding the item and place a bid electronically. Online auctions may be used for selling and buying an increasingly diverse set of goods and services. As a result, a variety of market environments may exist in which certain feedback rules, that is, rules for managing the information provided to the bidders about the status of the auction, may prevent an auction from achieving its full potential in reducing purchase cost for a buyer or increasing revenue for a seller.

SUMMARY

The problems noted above may be solved in large part by a method and related system for selecting feedback rules for an online auction. One exemplary embodiment may be a method comprising controlling feedback by customizing feedback rules for an online auction substantially no earlier than entry of auction rules into an auction program by an end-user, storing the customized feedback rules for future use by the auction program, and conducting the online auction by the auction program using the feedback rules.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
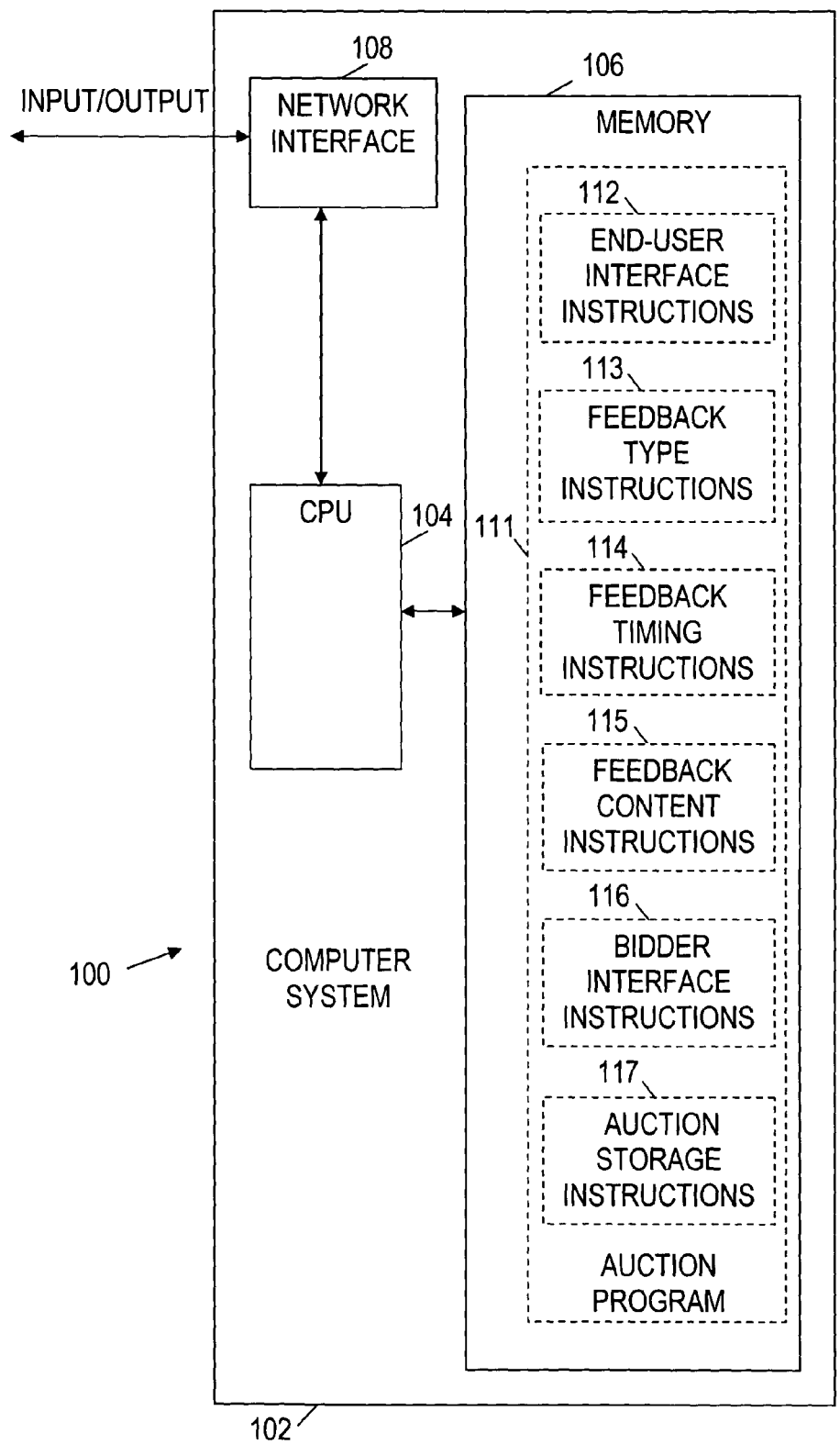
FIG. 1 illustrates a block diagram of an auction system in accordance with embodiments of the invention.

FIG. 1 illustrates a block diagram of an auction system 100 in accordance with embodiments of the invention. As illustrated in FIG. 1, the system 100 may comprise a computer system 102 having a CPU ("processor") 104 coupled to a memory 106 and a network interface 108. The memory 106 may store an auction program 111 comprising computer-readable instructions, such as end-user interface instructions 112, feedback type instructions 113, feedback timing instructions 114, feedback content instructions 115, bidder interface instructions 116, and feedback storage instructions. Each set of instructions of the auction program 111 is discussed more fully below. The memory 106 illustrated in FIG. 1 may be any of a variety of suitable instruction storage mediums, such as a floppy disk, a compact disk, a volatile memory, a non-volatile memory, a hard drive, or a combination thereof. The instructions comprising the auction program 111 may be written in any of a variety of computer languages such as C, C++, Java, Perl, Visual Basic, or other languages.

In at least some embodiments, the computer system 102 may operate as a server, whereby the auction program 111 is accessed by a client computer (not shown) using a universal resource locator (URL) address. The computer system 102 may be any networked computing system that allows multiple parties to access the auction program 111 through a network interface 108.

There may be a plurality of auction types that may be carried out by the auction program 111. In a first auction type, hereafter called a "rising bid auction," the party that offers the highest bid within a fixed time limit wins the auction. For example, in a rising bid auction three parties A, B, and C may be bidding on a stereo. If parties A, B, and C initially bid $20, $30, and $25 respectively, then party B has offered the highest bid. If the time limit of the auction has not expired, all parties may have equal opportunity to increase their bids. If the auction time has expired, and the current bids of parties A, B, and C are $70, $60, and $65 respectively, then party A has won the auction of the stereo by offering the highest bid.

In a second auction type, hereafter called a "falling bid auction," the party that offers the lowest bid within a fixed time limit wins the auction. For example, in a falling bid auction four parties M, N, 0, and P may be bidding for a highway construction contract. If parties M, N, O, and P initially bid $20M, $30M, $15M, and $25M respectively, then party O has offered the lowest bid. If the time limit has not expired, all parties may have equal opportunity to decrease their bids. If the auction time has expired, and the bids of M, N, O, and P are $12M, $8M, $14M, and $6M respectively, then P has won the auction for the exemplary highway construction contract by offering the lowest bid (i.e., P will be paid $6M in exchange for building the highway).

In both rising bid auctions and falling bid auctions, what a bidding party knows may affect the bids in the auction. Therefore, feedback rules (e.g., rules that control the timing, type, and content of feedback) may significantly affect the result of the auction. An auction system with a fixed and limited set of feedback rules may not achieve the result desired by the party placing an item up for bid. Specifically, a party offering to sell an item may not receive as much revenue as desired (rising bid auction) or a party seeking to buy services, e.g., a service contract, may not reduce purchasing costs as much as desired (falling bid auction). Hereafter, the party that initiates an auction using auction program 111 (whether to sell an item or to acquire an item or service) will be referred to as an "end-user" of the auction. In accordance with at least some embodiments of the invention, an end-user may select feedback rules for the online auction contemporaneously with entry of auction details into the auction program 111. An end-user may also customize feedback provided to bidders during an auction, possibly using auction program 111. More particularly, the auction program 111, when executed, may allow an end-user to dynamically customize the type of feedback, the timing of the feedback, and/or the content of the feedback for specific auctions.

As an example, consider an end-user who wishes to hold an auction to sell an item. In at least some embodiments, the end-user may access and provide input to the auction program 111 through network interface 108. Specifically, the end-user interface instructions 112 of the auction program 111 may provide a graphic interface (e.g., a window), or data to create the graphic interface, to an end-user computer (not shown) coupled to the computer system 102. The end-user may input auction details or auction rules such as identity, item details, desired method of payment, start time of auction, end time of auction, date of auction, and a minimum or maximum bid.

As part of the auction details, the end-user may also select feedback rules. Feedback rules may comprise a feedback type, feedback timing and feedback content. Feedback type rules may be selected using the feedback type instructions 113. For example, the feedback type may be "anonymous" or "personalized." Under an anonymous feedback type rule, the same feedback timing and content rules may apply to all bidders. In contrast, under personalized (i.e., individualized) feedback type rules, different content may be used for different bidders. For example, an end-user may wish for a particular bidder (e.g., the current supplier) to have information about the lowest rival bid continuously during the auction, while the information provided to other bidders may have different content.

As part of the auction details, the end-user may also select feedback timing rules, possibly using the feedback timing instructions 114. Feedback timing rules may allow an end-user to customize the timing of when feedback information is released to each bidder. For example, the timing may be periodic (e.g., every 5 minutes), continuous, or conditional (e.g., information is released if certain events occur). Specifically, parameters used for a conditional release of feedback information may comprise a change of a leading bid, change of a bidder's rank, time left in the auction, or a bid amount reaching a designated threshold value.

As part of the auction details, the end-user may also select feedback content rules, possibly using the feedback content instructions 115. Some exemplary feedback content rules may comprise, "no disclosure," "full disclosure," "leading K bids," "rank among leading X bids," and "whether among leading X bids." Under a "no disclosure" rule, no feedback is provided to the bidders about other bids. "No-disclosure" feedback may be used in a sealed-bid auction, for example.

Under a "full disclosure" feedback content rule, all current bids by all bidders may be disclosed to each bidder. Under a "leading K bids" rule (hereafter called the "L(K)" rule), a number of leading bids may be disclosed to the bidders. For example, if K=3, then the three leading bids may be disclosed to each bidder during the auction. Under a "rank among leading X bids" (hereafter called the "RAL(X)" rule), a bidder may be informed about his rank only if his rank is among the leading X bids. For example, if a bidder's bid is the $5^{th}$ leading bid, and X=3, then the bidder would not be informed of the rank of his bid. However, the bidder with the $5^{th}$ leading bid may be notified that his bid is not among the three leading bids. If a bidder's bid is the $2^{nd}$ leading bid, and X=3, then the bidder would be informed of his bid rank. When multiple items are auctioned in a single auction, the RAL(X) rule may be used to inform winners of the auction without revealing the bids of other winners.

Under the "whether among leading X bids" rule (hereafter called "WAL(X)" rule), a bidder may be informed whether his bid is among the leading X bids submitted, but not necessarily the rank of the bid. For example, under the WAL(X) rule with X=1, a bidder may be informed whether his current bid is the leading bid. As another example, under the WAL(X) rule, X may equal the quantity of items up for bid. In a scenario where X in a WAL(X) rule equals the number of items up for bid, the auction program 111 may inform the bidders that have submitted the leading X bids that their bids are currently winning bids.

In at least some embodiments, the WAL(X) and L(K) rules may be combined, where X and K may be two integers less than or equal to the number of bidders in an auction. According to a combination of the WAL(X) and L(K) rules, each bidder may be informed whether his current bid is among the leading X bids. If a bidder's current bid is not among the leading X bids, the bidder may not receive any other information. If the bidder's current bid is among the leading X bids, then the bidder may also learn the values of the leading K bids, where K<=X.

In at least some embodiments, the RAL(X) and L(K) rules may be combined. According to a combination of the RAL(X) and L(K) rules, a bidder may be informed of the rank of his/her bid and the values of the leading K bids if his/her bid is among the leading X bids, where K<=X. In contrast, if a bidder's bid is not among the leading X bids, that bidder receives no information regarding the leading K bids, but may be informed that his/her current bid is not among the leading X bids.

In at least some embodiments, the end-user may be allowed to select from a menu of pre-assembled feedback rules. In other embodiments, the system allows the user to assemble new feedback rules by using a scripting language that allows the end-user to express the timing, conditions and content of feedback provided to the bidders in a flexible manner.

In some embodiments, the end-user may configure the feedback rules either by combining available rules in a pre-assembled menu or by creating new rules using the scripting language. In some embodiments, the end-user may specify that a given feedback rule is followed until a pre-specified event occurs after which a different feedback rule is followed. The pre-specified event that triggers the switch from one set of feedback rules to another may be the clock-time or any event that can be tracked by the auction software system. For example, using this feature, an end-user can conduct an auction that provides feedback on the leading bid to all the bidders in the first 30 minutes of the auction and then switches to "no disclosure" feedback rule for the remaining duration of the auction. As another example, this feature allows an end-user to conduct an auction with no feedback during the first 10 minutes of the auction followed by a feedback rule that allows a given number of bidders with leading bids in the first phase (i.e., the first ten minutes) to observe the first-phase bids of the remaining bidders as well as the leading bid in the second phase.

Permitting the end-user to select from a variety of feedback rules may also reduce unintended leaks of information during an auction. For example, an end-user may decide to provide bidders with feedback that ranks each bidder's current bid. However, if there are a large number of bidders (e.g., 300), bidders may be discouraged from submitting a new bid upon discovering that there are many bidders participating in the auction (e.g., a bidder whose bid is ranked 247$^{th}$ knows that there are at least 247 bidders participating). This unintended leakage of information may be eliminated by using, for example, the RAL(X) rule described above with X=5. By using the RAL(X) rule with X=5, the 247$^{th}$ ranked bidder would be notified that his/her bid was not in the leading 5 bids, but no other information would be revealed. Accordingly, the 247$^{th}$ ranked bidder would know only that there are 5 bidders whose bids were better, and may decide to continue participating in the auction.

The bidder interface instructions 116 of the auction program 111 may provide a graphic interface (e.g., a window) on a remote computer (not shown) coupled to the computer system 102. A bidder may input information such as identity, bid amount, method of payment, time stamp, and a minimum or maximum bid that the bidder is willing to pay. As previously explained, the auction program 111 may be available on a network, where multiple bidders may independently access the auction program 111 and participate in an auction.

The auction storage instructions 117 of the auction program 111 may provide a means for storing auction rules and/or one or more sets of feedback rules, such as feedback type rules, feedback timing rules, and feedback content rules. For example, the auction storage instructions 117 may provide a data structure for storing auction rules and/or feedback rules. In at least some embodiments, the auction storage instructions 117 may permit an end-user to select previously stored feedback rules. Additionally, or alternatively, the auction storage instructions 117 may permit an end-user to select or view (i.e., compare) auction rules and/or feedback rules implemented by previous end-users of auction program 111 based on auction details, such as product type, entered by a current end-user.

Figure 2:
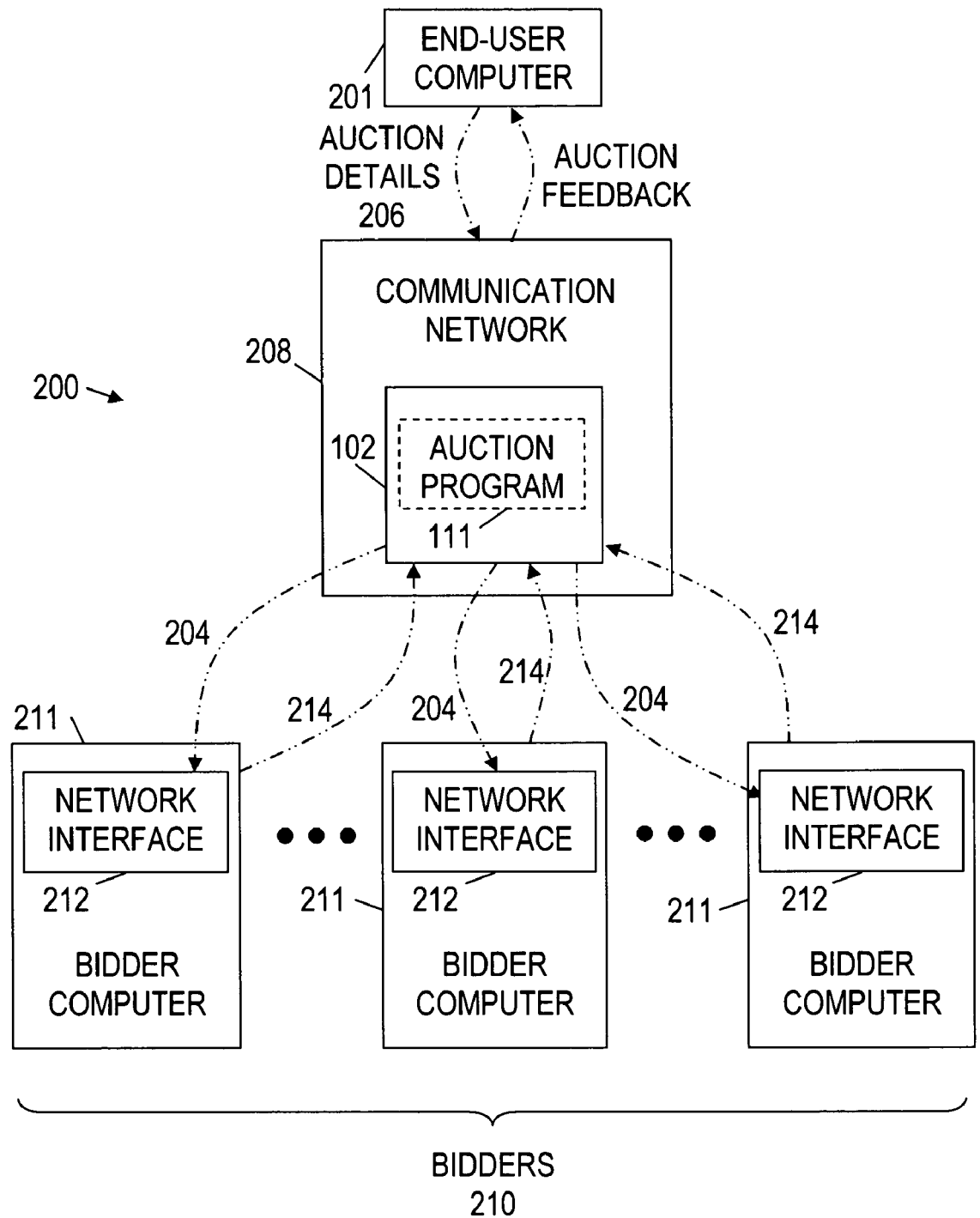
FIG. 2 illustrates a block diagram of an online auction system in accordance with embodiments of the invention.

FIG. 2 illustrates a block diagram of an online auction system 200 in accordance with al least some embodiments of the invention. As illustrated in FIG. 2, an end-user computer 201 and a plurality of bidder computers 211 may be coupled to a communication network 208. The communication network 208 may couple the end-user computer 201 and the bidder computers 211 to a computer system 102 executing an auction program 111. Using the end-user computer 201, an end-user may send auction details 206 to the auction program 111 through the communications network 208. For example, if the end-user is a "seller," the auction details 206 may comprise product details, minimum bid required, time of action, and/or desired feedback rules. Alternatively, if the end-user is a "buyer," the auction details 206 may comprise services being sought, maximum bid limit, time of auction, and/or desired feedback rules. End-users that have previously used the auction program 111 may choose feedback rules from one or more previously stored (and possibly previously used) feedback rules.

The bidders 210 may access the auction program 111 and submit bids 214 using the bidder computers 211. For example, a bidder 210 may input a URL address to access the auction program 111 as previously explained. Specifically, a bidder 210 may access applications and other electronic files (such as the auction program 111) through a network interface 212 of a bidder computer 211 that couples to the communication network 208. In accordance with the feedback rules of a specific auction, each bidder 210 may receive feedback 204 during an auction. For example, the auction program 111 may implement any of the feedback rules described above, or other rules, to determine the type, timing, and content of the feedback provided to the bidders 210.

Consider as an example a rising bid auction. In the exemplary rising bid auction, company Z may want to sell computers, e.g., a quantity of 10. Accordingly, company Z may access the auction program 111 and input auction details 206 relevant to the products being sold, e.g., descriptions of the computer, software included, and warranty information. In entering the auction details 206, company Z may select a feedback rule, and may decide to send anonymous feedback every fifteen minutes using the RAL(X) content rule with X=10.

Interested bidders may access the auction program 111 using the bidder computers 210, and submit bids 214 to purchase one or more of the computers. During the auction, the consumers may receive feedback 204 on their bids 214 according to the feedback rules designated by company Z. Specifically for this example, the consumers with the 10 leading bids may receive feedback in the form of a bid rank (1-10) every fifteen minutes. However, a consumer whose bid is not among the 10 leading bids may not receive any notification, or may only be notified that his/her bid is not among the leading 10 bids. When the auction time expires, the bidders that submitted the 10 highest bids would each receive a computer in exchange for their respective bid amounts.

Consider as an example a falling bid auction. In the exemplary falling bid auction, company A may be in need of marketing services. Accordingly, company A may access the auction program 111 and input auction details 206 relevant information regarding the services sought, e.g., service specifications and timing constraints. In entering the auction details, company A may select a feedback rule, and may decide to send feedback every 2 hours using the RAL(X) and L(K) combination rule with X=5 and K=3.

Interested bidders in the form of marketing companies may access the auction program 111 using bidder computers 210, and submit bids to provide the service. During the auction, the companies may receive feedback 204 on their bids 214 according to the feedback rules designated by company A. Specifically for this example, companies whose submitted bids are within the 5 leading bids would receive feedback ever two hours in the form of a bid rank (1-5) and a listing of the top 3 bids. Any company whose bid is not among the 5 leading bids may not receive any feedback, or may be notified only that his bid is not among the leading 5 bids. When the auction time expires, the marketing company that submitted the lowest bid would receive the money amount of their bid from company A in exchange for providing the service to company A.

Thus, in accordance with some embodiments, a user may select a feedback rule contemporaneously with entering auction details. In alternative embodiments of the invention, a user may also have the ability to change or modify the selected feedback rule during the online auction. Referring again briefly to FIG. 1, the end-user may access the end-user interface instructions 112 and/or the feedback storage instructions 117, and thereby modify desired operation of the feedback type instructions 113, the feedback timing instructions 114, and/or the feedback content instructions 115.

In some embodiments, the winner of a falling bid auction may be paid the second lowest bid. Offering to pay the winner of a falling bid auction the second lowest bid may function as an incentive to the bidders to participate in the auction. Therefore, in addition to choosing the feedback rules as described above, an end-user may also customize rules of the auction. For example, an end-user may select winning bid rules such as "highest bid wins," "lowest bid wins," or "winner is paid the second lowest bid." Therefore, one or more end-users may use the same auction program 111 to auction goods, services, contracts, or any other auctionable item, wherein the end-user may select feedback rules, and other auction details such as desired payment method, start time, end time, and minimum bid.

While some embodiments permit an end-user to customize feedback rules (e.g., feedback type, feedback timing, and feedback content), other embodiments may simplify the process by having the auction program select the feedback rules. For example, some embodiments of the auction program 111 may generalize feedback rules into categories such as low, medium, or high feedback (referring to an amount of feedback provide to bidders). Additionally, or alternatively, some embodiments may automate the selection of feedback rules according to other auction details as type of product, product quantity.

Automatic selection of a feedback rule may be based, at least in part, on feedback rules previously used and/or previously selected by an end-user. In particular, auction program 111 may store pre-determined or previously used feedback rules. For example, the auction storage instructions 117 may be used to store pre-determined or previously used feedback rules. In the event an end-user desires an automatic selection of feedback rules, the auction program 111 may compare auction details provided by the end-user with a data structure, e.g., a database, of auction rules, auction details, and/or feedback rules. The auction program 111 may select one or more feedback rules based on similarities between the current auction details (less the feedback rules) and previously stored and/or predetermined feedback rules.

Figure 3:
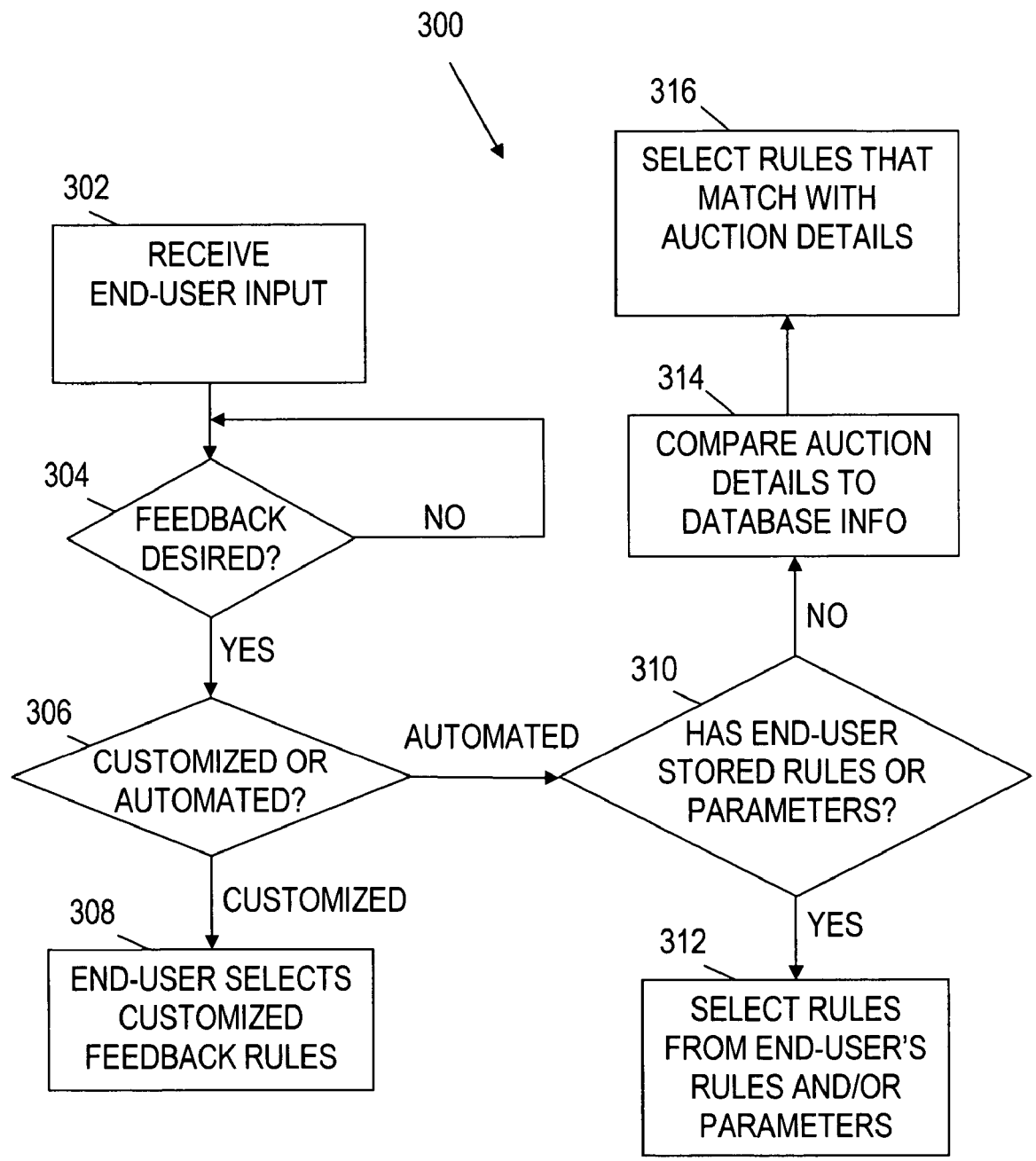
FIG. 3 illustrates a flowchart of a feedback rule selection method in accordance with embodiments of the invention.

FIG. 3 illustrates a flow chart of a method 300, possibly implemented in software executed in a computer, for selecting feedback rules by the auction program 111 in accordance with embodiments of the invention. The method 300 may comprise receiving the end-user input (block 302), possibly in the form of auction details. As previously explained, a user may input auction details such as item for auction, quantity of items, type of product, time of auction, minimum or maximum bid, desired method of payment, desired auction rules, and/or desired feedback rules. If no feedback is desired (block 304), the auction may proceed with no feedback. However, the end-user may later choose, possibly during the auction, to send feedback.

If the end-user selects to provide feedback (whether as part of an initial set-up or during the auction), a next step may be determining whether the selection of the feedback rules will be customized or automatic (block 306). If the end-user selects to customize feedback rules, the process may proceed to allowing the end user to enter and/or select feedback rules (block 308). If automated feedback rules are desired (block 306), a determination is made as to whether the end-user has previously stored one or more sets of feedback rules that may be used as a guide to determine which feedback rules to implement (block 310).

If the end-user has previously stored one or more sets of feedback rules, those feedback rules may be presented to the end-user for selection. Additionally, or alternatively, one or more previously used feedback rules may be selected based on similarities between a previous auction held by the end-user and the current auction (block 312). If the end-user has not previously stored feedback rules (block 310), or alternatively, if it is undesirable to use feedback rules previously stored by the end-user, auction details provided from the end-user may be compared with information in a database (block 314) whereby feedback rules that "match" with the auction details may be selected (block 316). For example, if most previous auctions of computer monitors implemented the WAL(X) rule (described above) with X=(the quantity of computer monitors), and a new end-user wants to auction computer monitors using automated feedback (block 306), then the auction program may automatically select the WAL (X) rule with X=(the quantity of computer monitors). Alternatively, the auction program may display a plurality of previously used feedback rules that have been used in similar auctions so that the end-user may select a rule.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer readable storage medium containing executable instructions that when executed by a computer system implement a method comprising:
   allowing selection of a feedback rule for an online auction contemporaneously with an end-user initiating the online auction; and
   allowing the end user to change selection of feedback rules for the online auction during the online auction.

2. The computer readable storage medium as defined in claim 1 wherein allowing selection of the feedback rule for an online auction contemporaneously with an end-user initiating the online auction further comprises allowing the end-user to select at least one feedback rule from the group:
   no feedback;
   full disclosure;
   disclosure of a specified number of leading bids only;
   informing a bidder of his rank only if the bidder's rank is among a specified number of leading bids; and
   informing a bidder whether a bid submitted by the bidder is among a specified number of leading bids.

3. The computer readable storage medium as defined in claim 1 wherein allowing selection of the feedback rule for the online auction contemporaneously with the end-user initiating the online auction further comprises allowing selection of at least one a group comprising:
   feedback type rules;
   feedback timing rules; and
   feedback content rules.

4. The computer readable storage medium as defined in claim 1 wherein the feedback rule further comprises selecting an event tracked by the online auction, wherein occurrence of the event triggers a change of feedback during the online auction.

5. A system for controlling an auction, comprising:
   interface means for providing a user interface through which an end-user may input details for an auction, including feedback rules regarding information provided to bidders about status of the auction wherein the interface means allows the end-user to dynamically customize feedback provided to the bidders during the auction; and
   auction means for carrying out the auction over a network in accordance with the input details for the auction.

6. A system according to claim 5 wherein the interface means allows the end-user to dynamically customize timing of the feedback provided to the bidders during the auction.

7. A system according to claim 5 wherein the details for the auction also include start time of the auction, end time of the auction and details regarding an item to be auctioned.

8. A system according to claim 5 wherein the feedback rules include a rule based on a bidder's rank in the auction.

9. A system according to claim 5 wherein the interface means allows the end-user to select from a menu of pre-assembled feedback rules.

10. A system according to claim 9 wherein at least one of the pre-assembled feedback rules includes a variable that is specified by the end-user.

11. A system according to claim 10 wherein the variable comprises a bidder's rank in the auction.

12. A system according to claim 5 wherein the interface means allows the end-user to assemble new feedback rules by using a scripting language.

13. A system according to claim 5 wherein the interface means allows the end-user to specify that a first feedback rule is followed until a pre-specified event occurs, after which a second feedback rule is followed.

14. A system according to claim 5 wherein the interface means allows the end-user to modify the feedback rule during the auction.

15. A system according to claim 5 wherein the user interface is a graphic interface.

* * * * *

UNITED STATES PATENT AND TRADEMARK OFFICE
CERTIFICATE OF CORRECTION

| | | |
|---|---|---|
| PATENT NO. | : 7,831,499 B2 | Page 1 of 1 |
| APPLICATION NO. | : 10/683985 | |
| DATED | : November 9, 2010 | |
| INVENTOR(S) | : Kemal Guler et al. | |

It is certified that error appears in the above-identified patent and that said Letters Patent is hereby corrected as shown below:

In column 8, line 41, in Claim 3, after "one" insert -- of --.

Signed and Sealed this
Twenty-second Day of March, 2011

David J. Kappos
*Director of the United States Patent and Trademark Office*